United States Patent
Liu et al.

(10) Patent No.: US 12,485,577 B2
(45) Date of Patent: Dec. 2, 2025

(54) STEAM UTILIZATION SYSTEM OF FACTORY PRODUCING CONCRETE PIPE PILE

(71) Applicant: GUANGDONG UNIVERSITY OF TECHNOLOGY, Guangzhou (CN)

(72) Inventors: Xiaozhou Liu, Guangzhou (CN); Jian Wen, Guangzhou (CN); Zudong Xie, Guangzhou (CN); Zelong Wen, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 368 days.

(21) Appl. No.: 18/299,739

(22) Filed: Apr. 13, 2023

(65) Prior Publication Data

US 2023/0264387 A1    Aug. 24, 2023

Related U.S. Application Data

(63) Continuation of application No. PCT/CN2022/099653, filed on Jun. 19, 2022.

(51) Int. Cl.
| | |
|---|---|
| *B28B 11/24* | (2006.01) |
| *F01K 3/24* | (2006.01) |
| *F01K 17/02* | (2006.01) |
| *F04F 5/16* | (2006.01) |
| *F04F 5/18* | (2006.01) |
| *F04F 13/00* | (2009.01) |

(Continued)

(52) U.S. Cl.
CPC ............ *B28B 11/245* (2013.01); *F01K 3/245* (2013.01); *F01K 17/02* (2013.01); *F04F 5/16* (2013.01);
(Continued)

(58) Field of Classification Search
CPC ....... B28B 11/245; F01K 3/245; F01K 17/02; F04F 5/16; F04F 5/18; F04F 13/00;
(Continued)

(56) References Cited

U.S. PATENT DOCUMENTS

| 2007/0169722 A1 | 7/2007 | Mannina et al. | |
| 2018/0209638 A1* | 7/2018 | Liu | ............... F22D 1/36 |

FOREIGN PATENT DOCUMENTS

| CN | 203494481 U | 3/2014 | |
| CN | 104802295 A * | 7/2015 | ............ B28B 11/24 |

(Continued)

OTHER PUBLICATIONS

CN-104802295-A translation (Year: 2025).*
(Continued)

*Primary Examiner* — Michael G Hoang
*Assistant Examiner* — Kurt Wolford

(57) ABSTRACT

A steam utilization system for producing a concrete pipe pile includes a steam conveying device, a steam curing pool, a plurality of reaction vessels, a steam generating device, a first steam distributor, a first pressure booster, a second pressure booster and a blowdown flash tank. A high-pressure steam inlet of the first steam distributor is communicated with the steam generating device, and a first steam inlet of the first pressure booster is communicated with a first high-pressure steam outlet of the first steam distributor. A second steam inlet of the first pressure booster is communicated with the steam conveying device, the steam outlet of the first booster is communicated with the steam inlet of each reaction vessel, a first steam inlet of a second pressure booster is communicated with the first steam distributor, a second steam inlet of the second pressure booster is communicated with the blowdown flash tank.

6 Claims, 2 Drawing Sheets

(51) Int. Cl.
*F22B 33/14* (2006.01)
*F22B 33/18* (2006.01)
*F22B 37/50* (2006.01)
*F22D 11/06* (2006.01)

(52) U.S. Cl.
CPC ............ *F22B 33/14* (2013.01); *F22B 33/185* (2013.01); *F22B 37/50* (2013.01); *F22D 11/06* (2013.01); *F04F 5/18* (2013.01); *F04F 13/00* (2013.01)

(58) Field of Classification Search
CPC ........ F22B 33/14; F22B 37/50; F22B 33/185; F22D 11/06
See application file for complete search history.

(56) References Cited

FOREIGN PATENT DOCUMENTS

| CN | 104908152 | A | * | 9/2015 | ........... B28B 11/245 |
| CN | 205174322 | U | * | 4/2016 | |
| CN | 105841127 | B | * | 1/2018 | ............... F22D 1/32 |
| CN | 109695484 | A | | 4/2019 | |
| CN | 109795019 | A | * | 5/2019 | |
| CN | 110388634 | A | * | 10/2019 | .............. F22B 31/08 |
| CN | 210100295 | U | | 2/2020 | |
| CN | 210266722 | U | * | 4/2020 | |
| CN | 112554977 | A | * | 3/2021 | ........... F01K 13/006 |

OTHER PUBLICATIONS

CN-104908152-A translation (Year: 2025).*
CN-105841127-B translation (Year: 2025).*
CN-109795019-A translation (Year: 2025).*
CN-110388634-A translation (Year: 2025).*
CN-112554977-A translation (Year: 2025).*
CN-205174322-U translation (Year: 2025).*
CN-210266722-U translation (Year: 2025).*
Internation Search Report of PCT/CN2022/099653, Mailed Nov. 28, 2022.

* cited by examiner

STEAM UTILIZATION SYSTEM OF FACTORY PRODUCING CONCRETE PIPE PILE

CROSS-REFERENCE TO RELATED APPLICATIONS

This application is a continuation of International Patent Application No. PCT/CN2022/099653 with a filing date of Jun. 19, 2022, designating the United States, and further claims priority to Chinese Patent Application No. 202210154974.X with a filing date of Feb. 21, 2022. The content of the aforementioned applications, including any intervening amendments thereto, are incorporated herein by reference.

TECHNICAL FIELD

The disclosure relates to the field of steam energy utilization, in particular to a system for utilization of steam residual pressure.

BACKGROUND ART

A concrete pipe pile is a kind of cement concrete product produced by a centrifugal casting process, which is widely used in building foundation engineering. In production of the concrete pipe pile, a two-time curing process of steam curing and autoclaved curing is usually adopted in order to enable concrete strength to meet strength grade requirements quickly and reduce operation cycles of pipe molds and yards. An amount of steam is required to be consumed in production and maintenance of concrete pipe piles.

At present, central heating is adopted in a factory producing concrete pipe piles. However, due to shortage of coal resource and its high price, steam delivered by a power plant to the factory producing the concrete pipe piles at night is not enough in pressure, which greatly affects production of the concrete pipe piles. However, it is necessary to use steam from the power plant so as to achieve the central heating, for which additional high-pressure steam has to be provided to boost a pressure of supplied steam of the power plant so as to meet production requirements.

A steam recycling system for pipe pile curing is disclosed in Chinese patent application No. 201920337710. 1, which includes a boiler room and an autoclave. The boiler room is connected with the autoclave through an air outlet pipeline. The autoclave is connected with a steam curing pool through a connecting pipeline. The steam curing pool is connected with a floor heating system through an extension pipeline. The floor heating system is connected to the boiler room through a return pipeline. However, the steam recycling system for pipe pile curing has following shortcomings or deficiencies: (1) there is no pressure boosting device in this patent, so it is impossible to realize pressure-boosting and utilization of steam; and (2) it is difficult to make full use of waste heat of steam released by the autoclave, because there is no need for the floor heating system in South China.

As another example, a steam recycling system of an autoclave for a pre-stressed pipe pile is disclosed in Chinese patent application No. 201510164061.6, which includes a boiler, an autoclave and a steam curing pool. The autoclave is connected with the boiler through a steam delivery pipeline. The steam delivery pipeline is provided with a steam delivery valve, the steam curing pool is connected with the autoclave through a steam exhaust pipeline, an exhaust valve is provided at a front end of the steam exhaust pipeline, and a steam delivery valve of the steam curing pool is provided at a rear end of the steam exhaust pipeline. However, the steam recycling system of the autoclave for the pre-stressed pipe pile has following shortcomings or deficiencies: (1) it is not suitable for a case where steam from the power plant is used to realize the central heating, with high use cost; and (2) heat of steam exhausted from the curing pool is not fully used.

Therefore, it has become an urgent problem in the industry to provide a steam utilization system of a factory producing concrete pipe piles that can be applied to the central heating, make full use of steam residual pressure, realize pressure-boosting and utilization of steam from existing central heating, and realize energy recycling.

SUMMARY

An object of the disclosure is to provide a steam pressure-boosting and utilization system of a factory producing a concrete pipe pile, which can make full use of low-pressure steam delivered by a power plant, and then provide high-pressure steam by using a natural gas boiler and an electric boiler, so that a pressure of the steam is boosted to meet production requirements of a concrete pipe pile factory, and the steam can not only be used for production but also hot water generated therefrom can serve to exchange heat, thus achieving effect of energy recycling.

In order to achieve the above object, a steam utilization system of a factory producing a concrete pipe pile is provided in the present disclosure, which includes a steam conveying device, a steam curing pool, a plurality of reaction kettles, a steam generating device, a first steam distributor, a first pressure booster, a second pressure booster and a blowdown flash tank. The steam conveying device configured for conveying a low-pressure steam from a power plant, the steam curing pool is configured for steam curing the concrete pipe pile with a first pressure steam, and the plurality of reaction kettles are configured for autoclaving the steam cured concrete pipe pile with a second pressure steam. The steam generating device is configured for generating a high-pressure steam, which is communicated with the first steam distributor through a pipeline. The first steam distributor includes a first cylinder body, a high-pressure steam inlet, a first high-pressure steam outlet a second high-pressure steam outlet and a third high-pressure steam outlet provided on the first cylinder body. The high-pressure steam inlet of the first steam distributor is communicated with the steam generating device through a pipeline. The first pressure booster includes a first pressure booster body, a first steam inlet of the first pressure booster, a second steam inlet of the first pressure booster and a steam outlet of the first pressure booster provided on the first pressure booster body. The first steam inlet of the first pressure booster is communicated with the first high-pressure steam outlet of the first steam distributor, the second steam inlet of the first pressure booster is communicated with the steam conveying device, and the steam outlet of the first pressure booster is communicated with a steam inlet of each of the plurality of reaction kettles through a reaction steam channel. The second pressure booster includes a second pressure booster body, a first steam inlet of the second pressure booster, a second steam inlet of the second pressure booster and a steam outlet of the second pressure booster provided on the second pressure booster body. The first steam inlet of the second pressure booster is communicated with the second high-pressure steam outlet of the first steam distributor, the second steam inlet of the second pressure booster is communicated with the blowdown flash tank, and the steam outlet of the second pressure booster is communicated with the steam curing pool through a pipeline. The blowdown flash tank includes a flash tank body, a steam inlet, a steam outlet and a sewage outlet provided on the flash tank body. The steam inlet is communicated with a steam and condensed water outlet of each of the plurality of reaction kettles, and the steam outlet is communicated with the second steam inlet of the second pressure booster.

Preferably, one blowdown flash tank is connected with 2 to 5 reaction kettles, such as 3 or 4 reaction kettles.

Preferably, the reaction kettle is a high-pressure reaction kettle.

Alternatively, the system further includes a second steam distributor and a third pressure booster. The second steam distributor includes a second cylinder body, a low-pressure steam inlet, a first low-pressure steam outlet and a second low-pressure steam outlet provided on the second cylinder. The low-pressure steam inlet is communicated with the steam outlet of the second pressure booster through a pipeline, the first low-pressure steam outlet is communicated with the steam curing pool to provide a low-pressure steam to the steam curing pool, and the second low-pressure steam outlet is communicated with the third pressure booster through a pipeline. The third pressure booster includes a third pressure booster body, a first steam inlet of the third pressure booster, a second steam inlet of the third pressure booster and a steam outlet of the third pressure booster provided on the third pressure booster body. The first steam inlet of the third pressure booster is communicated with the third high-pressure steam outlet of the first steam distributor, the second steam inlet of the third pressure booster is communicated with the second low-pressure steam outlet of the second steam distributor, and the steam outlet of the third pressure booster is communicated with each of the plurality of reaction kettles through a reaction steam channel.

Alternatively, internal structures of the first pressure booster, the second pressure booster and the third pressure booster are the same, including a first steam chamber communicated with a steam inlet for introducing the high-pressure steam, a nozzle provided at an end of the first steam chamber, a mixing chamber provided in the steam injection direction of the nozzle and communicated with the nozzle, a second steam chamber communicated with the mixing chamber and a steam inlet for introducing the low-pressure steam, and a diffuser provided at another end of the mixing chamber. An outlet direction of the diffuser is communicated with a steam outlet.

Alternatively, the reaction steam channel is provided with a steam storage device. The steam storage device is communicated with a steam inlet of each of the plurality of reaction kettles, and each steam inlet is provided with a valve and a pressure monitor.

Alternatively, the steam generating device includes an electric boiler and a natural gas boiler. The electric boiler is configured to generate steam by using electricity produced by a solar photovoltaic panel, and high-pressure steam discharge ports of the electric boiler and the natural gas boiler are respectively communicated with high-pressure steam inlets of the first steam distributor, so as to transport a generated high-pressure steam of 2.5 MPa to the first steam distributor.

Alternatively, the first pressure is set to 0 MPa and the second pressure is set to 1.0 MPa.

Alternatively, the steam generating device is configured to transport the generated high-pressure steam of 2.5 MPa to the first steam distributor, and the high-pressure steam of 2.5 MPa enters the first pressure booster from the first high-pressure steam outlet and the first steam inlet of the first pressure booster, and is mixed with a low-pressure steam of 0.7 MPa from the power plant conveyed by the steam conveying device so as to form a second pressure steam of 1.0 MPa. The second pressure steam of 1.0 MPa is delivered to the steam storage device through the steam outlet of the first pressure booster and the reaction steam channel in sequence, and then poured into each of the plurality of reaction kettles until a pressure in each of the plurality of reaction kettles reaches 1.0 MPa; then the valve is closed to stop pouring the second pressure steam of 1.0 MPa until the pressure drops to 0.8 MPa, and then the valve is opened to continue pouring the second pressure steam of 1.0 MPa. The high-pressure steam of 2.5 MPa enters the second pressure booster from the second high-pressure steam outlet and the first steam inlet of the second pressure booster, and is mixed with a steam of 0.1 MPa from the blowdown flash tank so as to form a first pressure steam of 0.3 MPa. The first pressure steam of 0.3 MPa enters the second steam distributor, into the steam curing pool through the first tow-pressure steam outlet, into the third pressure booster through the second low-pressure steam outlet, is mixed with the high-pressure steam of 2.5 MPa so as to form the second pressure steam of 1.0 MPa, and is conveyed to the steam storage device through the reaction steam channel via the steam outlet of the third booster.

Preferably, the second pressure steam of 1.0 MPa generated by the first pressure booster can be transported to reaction kettles in other workshops for autoclaved curing of the concrete pipe pile.

Preferably, autoclaved curing is made on the concrete pipe piles in the reaction kettles for 2 to 3 hours.

Alternatively, the system further includes a hot water pool. The hot water pool includes a water storage body, a first hot water inlet, a second hot water inlet and a hot water outlet provided on the water storage body. The first hot water inlet is communicated with a water outlet of the steam curing pool, and the second hot water inlet is communicated with the sewage outlet of the blowdown flash tank.

Alternatively, the system further includes a heat exchanger. The heat exchanger includes a heat exchanger body, a hot sewage inlet, a cold sewage outlet, a cold water inlet and a hot water outlet provided on the water heater body. The hot sewage inlet is communicated with the hot water outlet of the hot water pool, the cold sewage outlet is communicated with a drainage channel, the cold water inlet is communicated with a cold water source, and the hot water outlet is communicated with the steam generating device.

Alternatively, a water delivery valve is provided on a pipeline between the second hot water inlet and the sewage outlet of the blowdown flash tank, and a water supplementing pump is provided on a pipeline between the cold water source and the cold water inlet.

Alternatively, hot sewage of 85 to 95 degrees Celsius from the blowdown flash tank and hot water of 65 to 75 degrees Celsius from the steam curing pool enter the heat exchanger via the hot water pool, which exchange heat with cold water of 20 to 25 degrees Celsius from the cold water source, formed hot water of 70 to 80 degrees Celsius is transported to the steam generating device to generate a high-pressure steam, and cold sewage of 20 to 25 degrees Celsius formed after heat exchanging is discharged to the drainage channel.

The disclosure has following advantages: (1) the steam residual pressure generated after high-pressure steam curing is fully developed, and the first pressure steam formed after mixing with the high-pressure steam is provided to the steam curing pool so as to cure the concrete pipe pile by using steam, so that energy of the steam is fully utilized, which is more energy-saving and environment-friendly; (2) energy of the hot water discharged from the steam curing pool and the blowdown flash tank is effectively utilized, and the cold water is replaced with the hot water of about 75 degrees Celsius, which is then provided to the electric boiler and the natural gas boiler, so that the high-pressure steam can be generated quickly, which not only improves energy utilization of the whole system, but also improves steam generation efficiency, which is energy-saving and environment-friendly; (3) it is suitable for central heating with a steam from the power plant, which can improve a pressure of the steam from the power plant so as to ensure production capacity, and at the same time to realize environmental protection effect.

DETAILED DESCRIPTION

Figure 1:
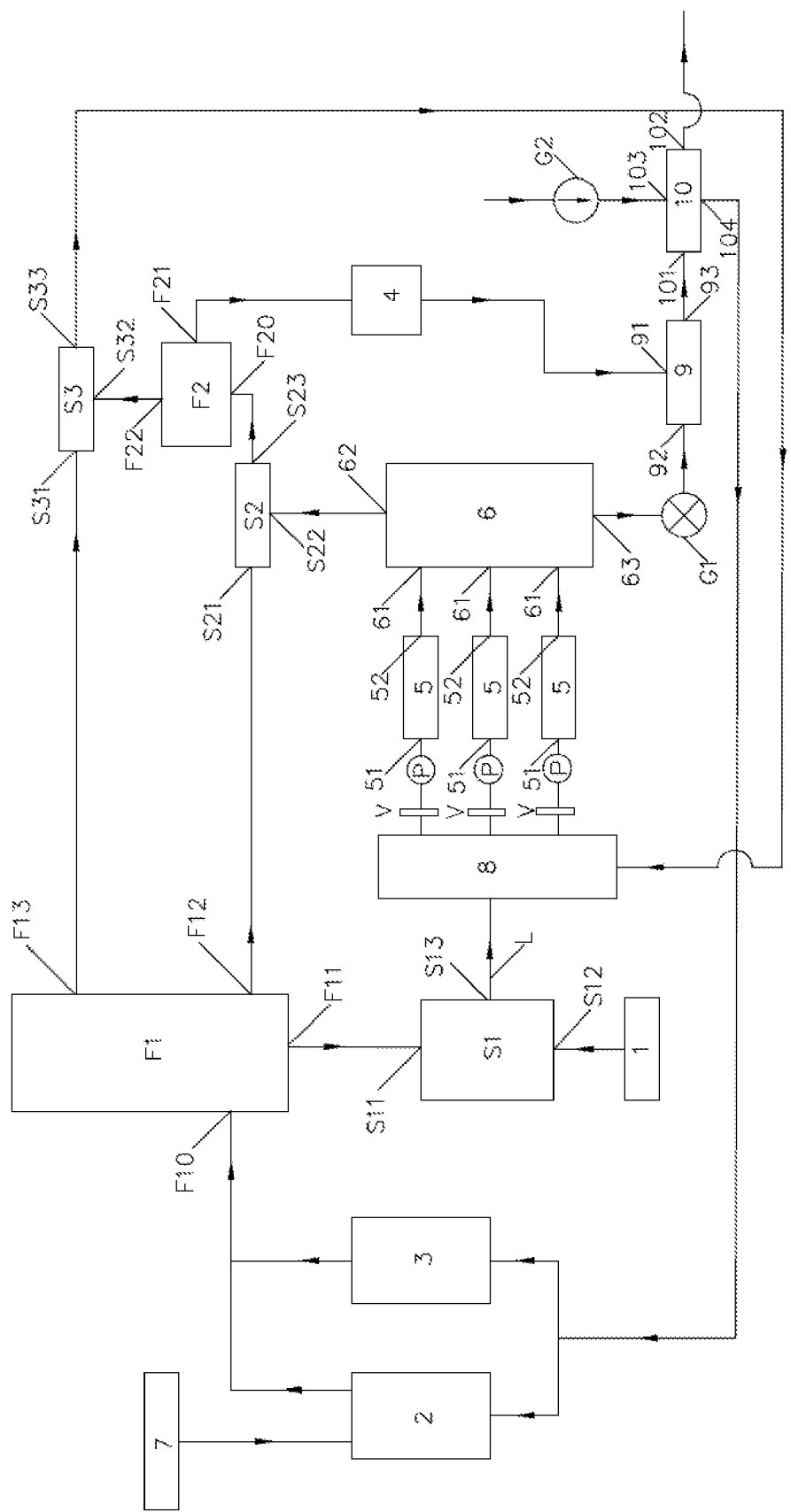
FIG. 1 shows a schematic structural diagram of a steam utilization system of a factory producing a concrete pipe pile according to the present disclosure.

Embodiments of the present disclosure will be described in detail below, examples of which are shown in the accompanying drawings, in which same or similar reference numerals refer to same or similar elements or elements with same or similar functions throughout. The embodiments described below with reference to the drawings are exemplary and are intended to explain the present disclosure, but should not be construed as limiting the present disclosure.

Referring to FIG. 1, as a non-limiting embodiment, the steam utilization system of the factory producing the concrete pipe pile according to the present disclosure includes a steam conveying device 1, an electric boiler 2, a natural gas boiler 3, a steam curing pool 4, three reaction vessels 5, a blowdown flash tank 6, a first steam distributor F1, a second steam distributor F2, a first pressure booster S1, a second pressure booster S2 and a third pressure booster S3.

In this non-limiting embodiment, the concrete pipe pile is steam cured in the steam curing pool 4 using a first pressure steam of 0.3 MPa, autoclaved curing is performed on the steam cured concrete pipe pile in the reaction kettle 5 using a second pressure steam of 1.0 MPa. The steam conveying device 1 is configured to convey a low-pressure steam of 0.7 MPa from the power plant to the first pressure booster S1, and the electric boiler 2 and the natural gas boiler 3 are configured to generate a high-pressure steam of 2.5 MPa respectively, and the high-pressure steam is conveyed to the first steam distributor F1. As shown in FIG. 1, the electric boiler 2 is configured to generate steam using electricity produced by a solar photovoltaic panel 7.

The first steam distributor F1 includes a first cylinder body (not numbered in the figure), a high-pressure steam inlet F10, a first high-pressure steam outlet F11, a second high-pressure steam outlet F12, and a third high-pressure steam outlet F13, and the high-pressure steam inlet F10 of the first steam distributor F1 is communicated with the electric boiler 2 and the natural gas boiler 3 through pipelines.

The first pressure booster S1 includes a first pressure booster body (not numbered in the figure), a first steam inlet S11 of the first pressure booster, a second steam inlet S12 of the first pressure booster and a steam outlet S13 of the first pressure booster. The first steam inlet S11 of the first pressure booster is communicated with the first high-pressure steam outlet F11 of the first steam distributor F1, the second steam inlet S12 of the first pressure booster is communicated with the steam conveying device 1, and the steam outlet S13 of the first pressure booster is communicated with the steam inlet 51 of each of the plurality of reaction kettles 5 through a reaction steam channel L.

The second pressure booster S2 includes a second pressure booster body (not numbered in the figure), a first steam inlet S21 of the second pressure booster, a second steam inlet S22 of the second pressure booster and a steam outlet S23 of the second pressure booster. The first steam inlet S21 of the second pressure booster is communicated with the second high-pressure steam outlet F12 of the first steam distributor F1, the second steam inlet S22 of the second pressure booster is communicated with the blowdown flash tank 6, and the steam outlet S23 of the second pressure booster is communicated with the steam curing pool 4 through a pipeline.

The blowdown flash tank 6 includes a flash tank body (not numbered in the figure), a steam inlet 61, a steam outlet 62 and a sewage outlet 63. The steam inlet 61 is communicated with a steam and condensed water outlet 52 of each of the plurality of reaction kettles 5, and the steam outlet 62 is communicated with the second steam inlet S22 of the second pressure booster S2.

As another non-limiting embodiment, the second steam distributor F2 includes a second cylinder body (not numbered in the figure), a low-pressure steam inlet F20, a first low-pressure steam outlet F21 and a second low-pressure steam outlet F22. The low-pressure steam inlet F20 is communicated with the steam outlet S23 of the second pressure booster S2 through a pipeline, the first low-pressure steam outlet F21 is communicated with the steam curing pool 4 to provide a low-pressure steam of 0.3 MPa to the steam curing pool 4, and the second low-pressure steam outlet F22 is communicated with the third pressure booster S3 through a pipeline.

The third pressure booster S3 includes a third pressure booster body (not numbered in the figure), a first steam inlet S31 of the third pressure booster, a second steam inlet S32 of the third pressure booster and a steam outlet S33 of the third pressure booster. The first steam inlet S31 of the third pressure booster is communicated with the third high-pressure steam outlet F13 of the first steam distributor F1, the second steam inlet S32 of the third pressure booster S3 is communicated with the second low-pressure steam outlet F22 of the second steam distributor F2, and the steam outlet S33 of the third pressure booster is communicated with each of the plurality of reaction kettles 5 through a reaction steam channel L.

Figure 2:
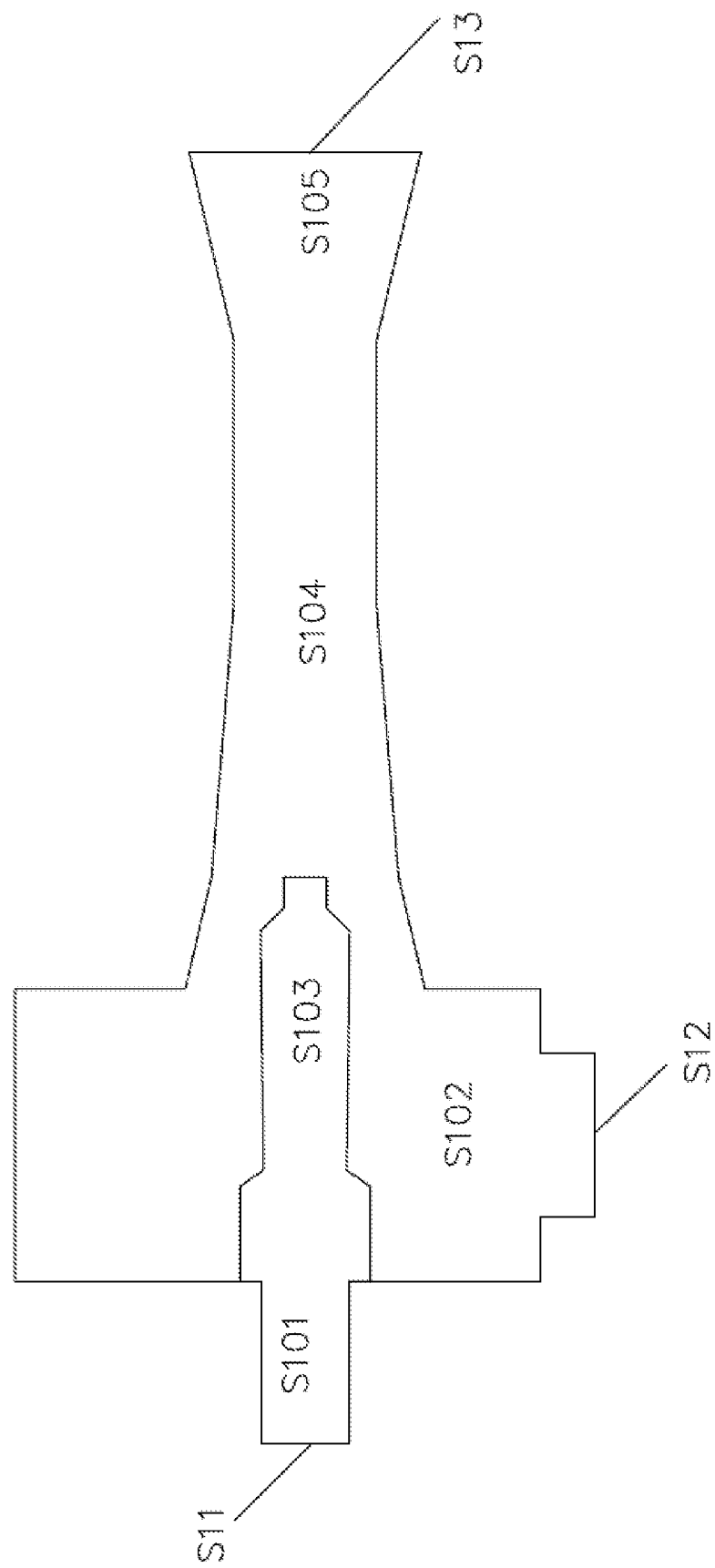
FIG. 2 shows a structural schematic diagram of a first pressure booster according to the present disclosure.

In this non-limiting embodiment, internal structures of the first pressure booster S1, the second pressure booster S2 and the third pressure booster S3 are the same. Taking the first pressure booster S1 as an example, as shown in FIG. 2, its internal structure includes a first steam chamber S101, a second steam chamber S102, a nozzle S103, a mixing chamber S104 and a diffuser S105. Specifically, The first steam inlet S11 of the first pressure booster for introducing a high-pressure steam is communicated with the first steam chamber S101, and the high-pressure steam enters the mixing chamber S104 at a high speed via the nozzle S103 so as to form a local negative pressure, so that a low-pressure steam at the second steam inlet S12 of the first pressure booster is sucked into the mixing chamber S104 and mixed with the high-pressure steam to form a medium-pressure steam at the diffuser S105, which is delivered to the steam outlet S13 of the first pressure booster and ejected out of the first pressure booster S1.

As another non-limiting embodiment, the reaction steam channel L is provided with a steam storage device 8. The steam storage device 8 is communicated with the steam inlet 51 of each of the plurality of reaction kettles 5, and each steam inlet 51 is provided with a valve V and a pressure monitor P, so that a steam pressure in each reaction kettle can be monitored and steam injection for each reaction kettle can be controlled at any time.

It can be seen that the electric boiler 2 and the natural gas boiler 3 are configured to transport the generated high-pressure steam of 2.5 MPa to the first steam distributor F1, and the high-pressure steam of 2.5 MPa enters the first pressure booster S1 from the first high-pressure steam outlet F11 and the first steam inlet S11 of the first pressure booster, and is mixed with a low-pressure steam of 0.7 MPa from the power plant conveyed by the steam conveying device 1 so as to form a second pressure steam of 1.0 MPa. The second pressure steam of 1.0 MPa is delivered to the steam storage device 8 through the reaction steam channel L through the steam outlet S13 of the first pressure booster, and then poured into each of the plurality of reaction kettles 5 until a pressure in each of the plurality of reaction kettles 5 reaches 1.0 MPa; then the valve V is closed to stop pouring the second pressure steam of 1.0 MPa until the pressure drops to 0.8 MPa, and then the valve V is opened to continue pouring the second pressure steam of 1.0 MPa. Meanwhile, the high-pressure steam of 2.5 MPa enters the second pressure booster S2 from the second high-pressure steam outlet F12 and the first steam inlet S21 of the second pressure booster, and is mixed with a steam of 0.1 MPa from the blowdown flash tank 6 so as to form a first pressure steam of 0.3 MPa. The first pressure steam of 0.3 MPa enters the second steam distributor F2, into the steam curing pool 4 through the first low-pressure steam outlet F21, into the third pressure booster S3 through the second low-pressure steam outlet F22, is mixed with the high-pressure steam of 2.5 MPa so as to form the second pressure steam of 1.0 MPa, and is conveyed to the steam storage device through the reaction steam channel L via the steam outlet S33 of the third booster.

There may be several workshops for producing concrete pipe piles, for example, 5 to 10 workshops, so that the second pressure steam of 1.0 MPa generated by the first pressure booster S1 can also be transported to high-pressure reaction kettles 5 of other workshops for autoclaved curing of the concrete pipe piles.

As another non-limiting embodiment, the system further includes a hot water tank 9 and a heat exchanger 10. The hot water tank 9 includes a water storage body (not numbered in the figure), a first hot water inlet 91, a second hot water inlet 92 and a hot water outlet 93. The first hot water inlet 91 is communicated with the water outlet (not numbered in the figure) of the steam curing pool 4, and the second hot water inlet 92 is communicated with the sewage outlet 63 of the sewage flash tank 6. The heat exchanger 10 comprises a heat exchanger body (not numbered in the figure), a hot sewage inlet 101, a cold sewage outlet 102, a cold water inlet 103 and a hot water outlet 104. The hot sewage inlet 101 is connected with the hot water outlet 93 of the hot water pool, the cold sewage outlet 102 is connected with a drainage channel (not shown in the figure), the cold water inlet 103 is connected with a cold water source (not shown in the figure), and the hot water outlet 104 is communicated with the electric boiler 2 and the natural gas boiler 3.

For convenience of control, a water delivery valve G1 is provided on a pipeline between the second hot water inlet 92 and the sewage outlet 63 of the blowdown flash tank 6, and a water supplementing pump G2 is provided on a pipeline between the cold water source and the cold water inlet 103.

Thus, hot sewage of 85 to 95 degrees Celsius from the blowdown flash tank 6 and hot water of 65 to 75 degrees Celsius from the steam curing pool 4 enter the heat exchanger 10 via the hot water pool 9, which exchange heat with cold water of 20 to 25 degrees Celsius from the cold water source, formed hot water of 70 to 80 degrees Celsius is transported to the electric boiler 2 and the natural gas boiler 3 to generate a high-pressure steam, and cold sewage of 20 to 25 degrees Celsius formed after heat exchanging is discharged to the drainage channel.

Although preferred embodiments of the present disclosure have been described in detail herein, it should be understood that the present disclosure is not limited to specific structures described and illustrated in detail herein, and other modifications and variations can be made by those skilled in the art without departing from spirit and scope of the present disclosure.

What is claimed is:

1. A steam utilization system of a factory producing a concrete pipe pile, comprising: a steam conveying pipeline, a steam curing pool and a plurality of reaction kettles, the steam conveying pipeline being configured for conveying a low-pressure steam from a power plant, the steam curing pool being configured for steam curing the concrete pipe pile with a first pressure steam, and the plurality of reaction kettles being configured for autoclaving the steam cured concrete pipe pile with a second pressure steam; wherein the steam utilization system of the factory producing the concrete pipe pile further comprises a steam generating device, a first steam distributor, a first pressure booster, a second pressure booster, a blowdown flash tank, a second steam distributor and a third pressure booster, wherein the steam generating device is configured for generating a high-pressure steam, which is communicated with the first steam distributor through a first pipeline;

the first steam distributor comprises a first cylinder body, a high-pressure steam inlet, a first high-pressure steam outlet, a second high-pressure steam outlet and a third high-pressure steam outlet provided on the first cylinder body, the high-pressure steam inlet of the first steam distributor being communicated with the steam generating device through the first pipeline;

the steam generating device comprises an electric boiler and a natural gas boiler, the electric boiler being configured to generate steam by using electricity produced by a solar photovoltaic panel, and high-pressure steam discharge ports of the electric boiler and the natural gas boiler being respectively communicated with the high-pressure steam inlet of the first steam distributor, so as to transport a generated high-pressure steam of 2.5 MPa to the first steam distributor;

the first pressure booster comprises a first pressure booster body, a first steam inlet of the first pressure booster, a second steam inlet of the first pressure booster and a steam outlet of the first pressure booster provided on the first pressure booster body, the first steam inlet of the first pressure booster being communicated with the first high-pressure steam outlet of the first steam distributor, the second steam inlet of the first pressure booster being communicated with the steam conveying pipeline, and the steam outlet of the first pressure booster being communicated with a steam inlet of each of the plurality of reaction kettles through a reaction steam channel;

the second pressure booster comprises a second pressure booster body, a first steam inlet of the second pressure booster, a second steam inlet of the second pressure booster and a steam outlet of the second pressure booster provided on the second pressure booster body, the first steam inlet of the second pressure booster being communicated with the second high-pressure steam outlet of the first steam distributor, the second steam inlet of the second pressure booster being communicated with the blowdown flash tank, and the steam outlet of the second pressure booster being communicated with the steam curing pool through a second pipeline and a third pipeline; and the blowdown flash tank comprises a flash tank body, a steam inlet, a steam outlet and a sewage outlet provided on the flash tank body, the steam inlet being communicated with a steam and condensed water outlet of each of the plurality of reaction kettles, and the steam outlet being communicated with the second steam inlet of the second pressure booster in the second pressure booster;

the second steam distributor comprises a second cylinder body, a low-pressure steam inlet, a first low-pressure steam outlet and a second low-pressure steam outlet provided on the second cylinder, the low-pressure steam inlet being communicated with the steam outlet of the second pressure booster in the second pressure booster through the second pipeline, the first low-pressure steam outlet being communicated with the steam curing pool through the third pipeline to provide a low-pressure steam to the steam curing pool, and the second low-pressure steam outlet being communicated with the third pressure booster through a fourth pipeline; and the third pressure booster comprises a third pressure booster body, a first steam inlet of the third pressure booster, a second steam inlet of the third pressure booster and a steam outlet of the third pressure booster provided on the third pressure booster body, the first steam inlet of the third pressure booster being communicated with the third high-pressure steam outlet of the first steam distributor, the second steam inlet of the third pressure booster being communicated with the second low-pressure steam outlet of the second steam distributor, and the steam outlet of the third pressure booster being communicated with each of the plurality of reaction kettles through a reaction steam channel;

internal structures of the first pressure booster, the second pressure booster and the third pressure booster are the same, including a first steam chamber communicated with a steam inlet for introducing the high-pressure steam, a nozzle provided at an end of the first steam chamber, a mixing chamber provided in a steam injection direction of the nozzle and communicated with the nozzle, a second steam chamber communicated with the mixing chamber and a steam inlet for introducing the low-pressure steam, and a diffuser provided at another end of the mixing chamber, an outlet direction of the diffuser being communicated with a steam outlet; and the steam generating device is configured to transport the generated high-pressure steam of 2.5 MPa to the first steam distributor, and the high-pressure steam of 2.5 MPa enters the first pressure booster from the first high-pressure steam outlet and the first steam inlet of the first pressure booster, and is mixed with a low-pressure steam of 0.7 MPa from the power plant conveyed by the steam conveying pipeline so as to form a second pressure steam of 1.0 MPa; the second pressure steam of 1.0 MPa is transported to a steam storage tank through the steam outlet of the first pressure booster and the reaction steam channel in sequence, and then poured into each of the plurality of reaction kettles until a pressure in each of the plurality of reaction kettles reaches 1.0 MPa; and then a valve is closed to stop pouring the second pressure steam of 1.0 MPa until the pressure drops to 0.8 MPa, and then the valve is opened to continue pouring the second pressure steam of 1.0 MPa; and the high-pressure steam of 2.5 MPa enters the second pressure booster from the second high-pressure steam outlet and the first steam inlet of the second pressure booster, and is mixed with a steam of 0.1 MPa from the blowdown flash tank so as to form a first pressure steam of 0.3 MPa; the first pressure steam of 0.3 MPa enters the second steam distributor, the first pressure steam of 0.3 MPa then enters either into the steam curing pool through the first low-pressure steam outlet or enters into the third pressure booster through the second low-pressure steam outlet, which is mixed with the high-pressure steam of 2.5 MPa so as to form the second pressure steam of 1.0 MPa, which is conveyed to the steam storage tank through the reaction steam channel via the steam outlet of the third booster.

2. The steam utilization system of the factory producing the concrete pipe pile according to claim 1, wherein the reaction steam channel is provided with the steam storage tank the steam storage tank being communicated with the steam inlet of each of the plurality of reaction kettles, and each steam inlet being provided with the valve and a pressure monitor.

3. The steam utilization system of the factory producing the concrete pipe pile according to claim 1, wherein the first pressure is set to 0.3 MPa and the second pressure is set to 1.0 MPa.

4. The steam utilization system of the factory producing the concrete pipe pile according to claim 3, further comprising a hot water pool, wherein the hot water pool comprises a water storage body, a first hot water inlet, a second hot water inlet and a hot water outlet provided on the water storage body, the first hot water inlet being communicated with a water outlet of the steam curing pool, and the second hot water inlet being communicated with the sewage outlet of the blowdown flash tank.

5. The steam utilization system of the factory producing the concrete pipe pile according to claim 4, further comprising a heat exchanger, wherein the heat exchanger comprises a heat exchanger body, a hot sewage inlet, a cold sewage outlet, a cold water inlet and a hot water outlet provided on the water heater body, the hot sewage inlet being communicated with the hot water outlet of the hot water pool, the cold sewage outlet being communicated with a drainage channel, the cold water inlet being communicated with a cold water source, and the hot water outlet being communicated with the steam generating device.

6. The steam utilization system of the factory producing the concrete pipe pile according to claim 5, wherein a water delivery valve is provided on a pipeline between the second hot water inlet and the sewage outlet of the blowdown flash tank, and a water supplementing pump is provided on a pipeline between the cold water source and the cold water inlet.

\* \* \* \* \*